United States Patent [19]

Dürst

[11] 4,109,859

[45] Aug. 29, 1978

[54] HOT WATER FLOOR HEATER

[76] Inventor: Felix Dürst, CH-8165 Oberweningen-Schöfflisdorf, Switzerland

[21] Appl. No.: 693,155

[22] Filed: Jun. 7, 1976

[30] Foreign Application Priority Data

Jun. 9, 1975 [CH] Switzerland ............... 7393/75
Nov. 12, 1975 [CH] Switzerland ............. 14628/75
Apr. 23, 1976 [CH] Switzerland ............... 5108/76

[51] Int. Cl.² .................................... F24H 9/08
[52] U.S. Cl. ............................... 237/69; 165/49
[58] Field of Search ............... 237/69, 43; 62/235; 165/49, 53, 171, 67; 138/106; 248/65, 68 R

[56] References Cited

U.S. PATENT DOCUMENTS

| 1,125,113 | 1/1915 | Junkers | 165/171 |
| 2,372,674 | 4/1945 | Jordon | 248/65 |
| 2,520,446 | 8/1950 | Thrush | 236/12 A |
| 2,613,900 | 10/1952 | Byrnie | 248/68 R |
| 2,897,252 | 7/1959 | Martin | 174/35 |
| 3,384,158 | 5/1968 | Rothenbach | 165/49 |

FOREIGN PATENT DOCUMENTS

| 17,756 of | 1929 | Australia | 237/69 |
| 377,392 | 6/1961 | Switzerland | 165/67 |

Primary Examiner—William E. Wayner
Attorney, Agent, or Firm—McGlew and Tuttle

[57] ABSTRACT

The heater is in the form of a hot water carrying pipe coil supported on a suitable base, such as a sub-floor, and having spaced parallel pipe ducts interconnected by pipe bends. A pair of parallel supporting laths, preferably in the form of flat bars, are fixed on the sub-floor in spaced relation to the opposite side walls of a room to be heated, and circularly curved members are secured to the laths at spacings therealong equal to the spacing between the pipe ducts, the curved members on one lath being staggered longitudinally relative to the curved members on the other lath. The connecting bends of the pipe coil are looped around these curved members, which latter thus serve as a pipe laying gauge. Stop members are secured to the laths in spaced relation to the free ends of the curved members to form, in effect, troughs for the connecting pipe bends. Heat transmitting metal lamellae are secured to the pipe ducts to interconnect adjacent pipe ducts, and these lamellae may be formed with half-shell portions at each end, one overlying a pipe duct and the other underlying the adjacent pipe duct. The lamellae may be formed with alternating rows of depressions and elevations. In hard to heat areas of the floor, the parallel pipe ducts may be arranged much closer together than in the remainder of the floor, as by having a pitch which is one half the pitch of the pipe ducts in the remainder of the floor and, in such case, the curved members in the hard to heat area of the floor have an angular extent of more than 180° and a radius which is less from that of the curved members in the remainder of the floor. The lamellae may be metal or may be metal powder-containing plastic.

23 Claims, 14 Drawing Figures

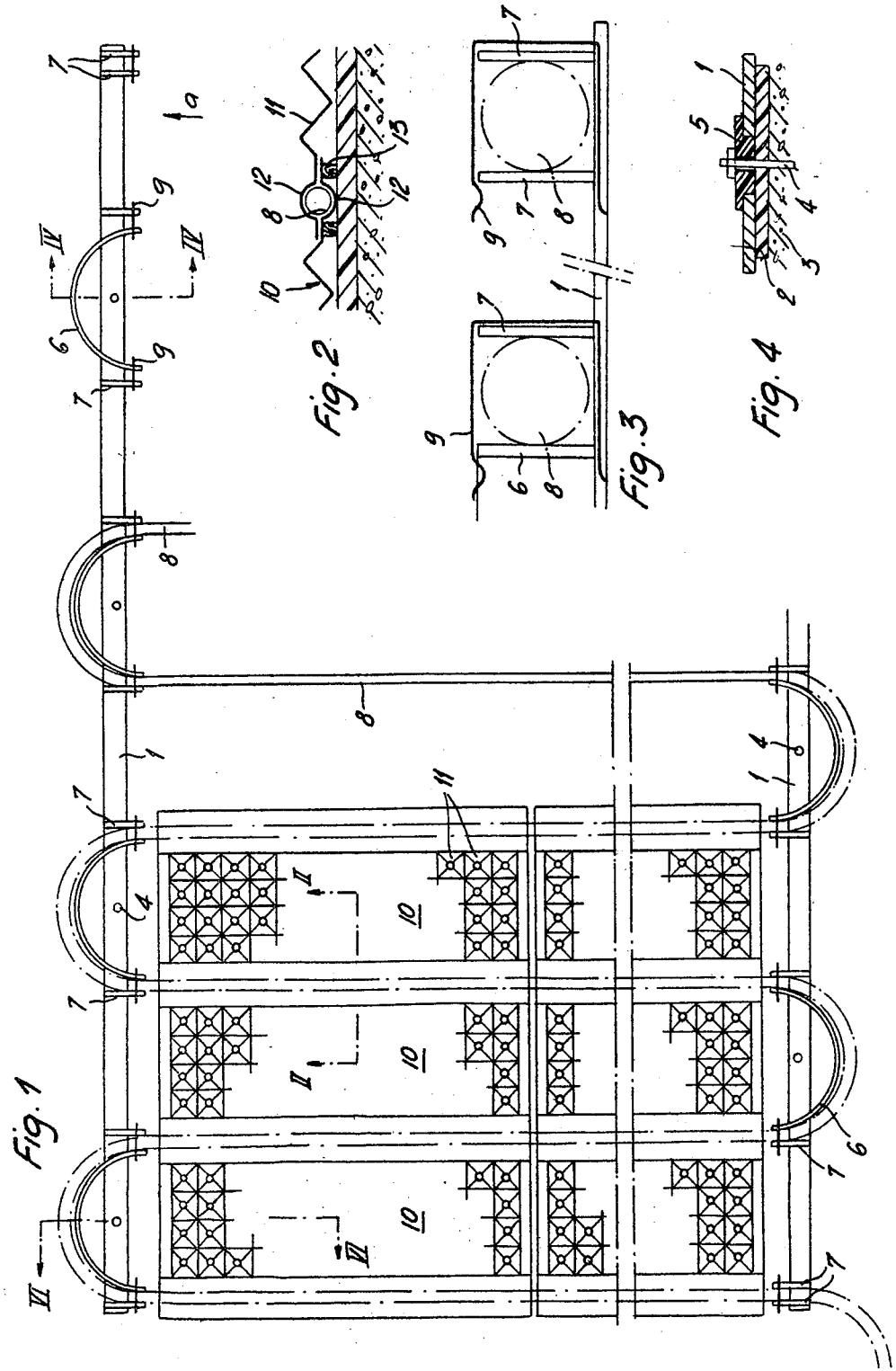

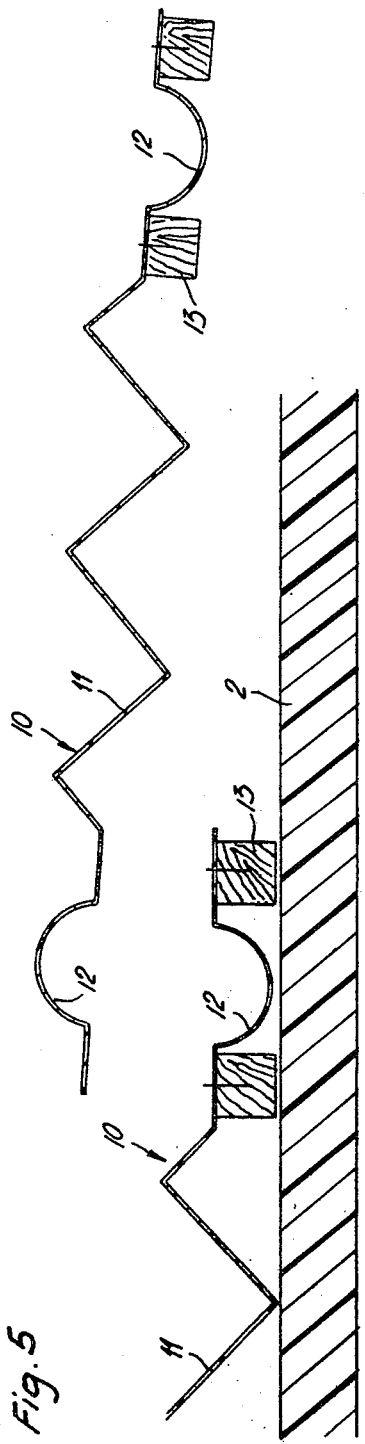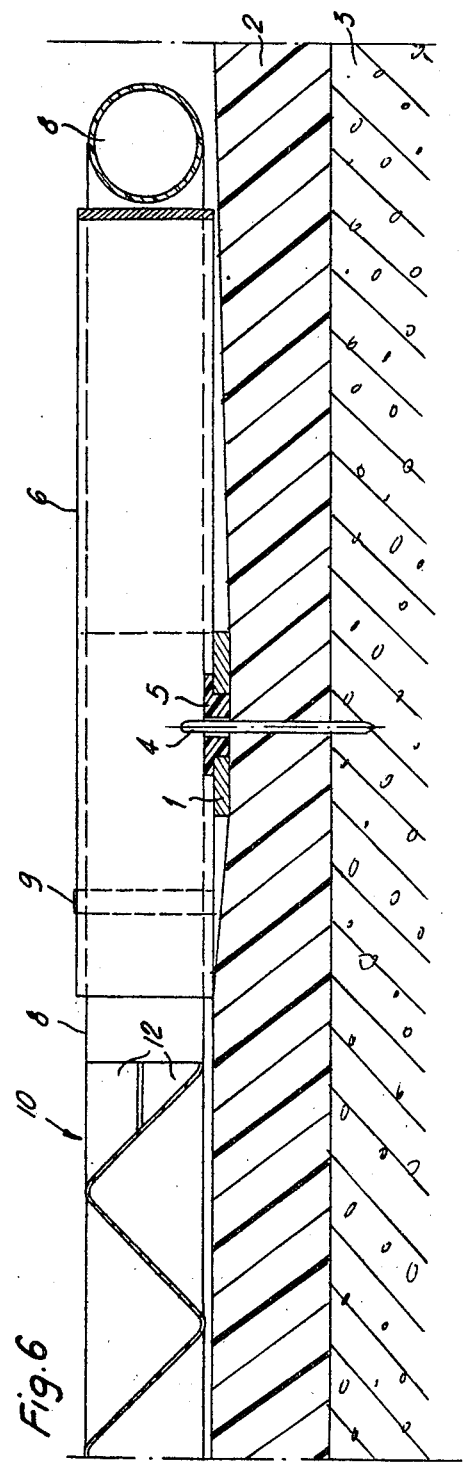

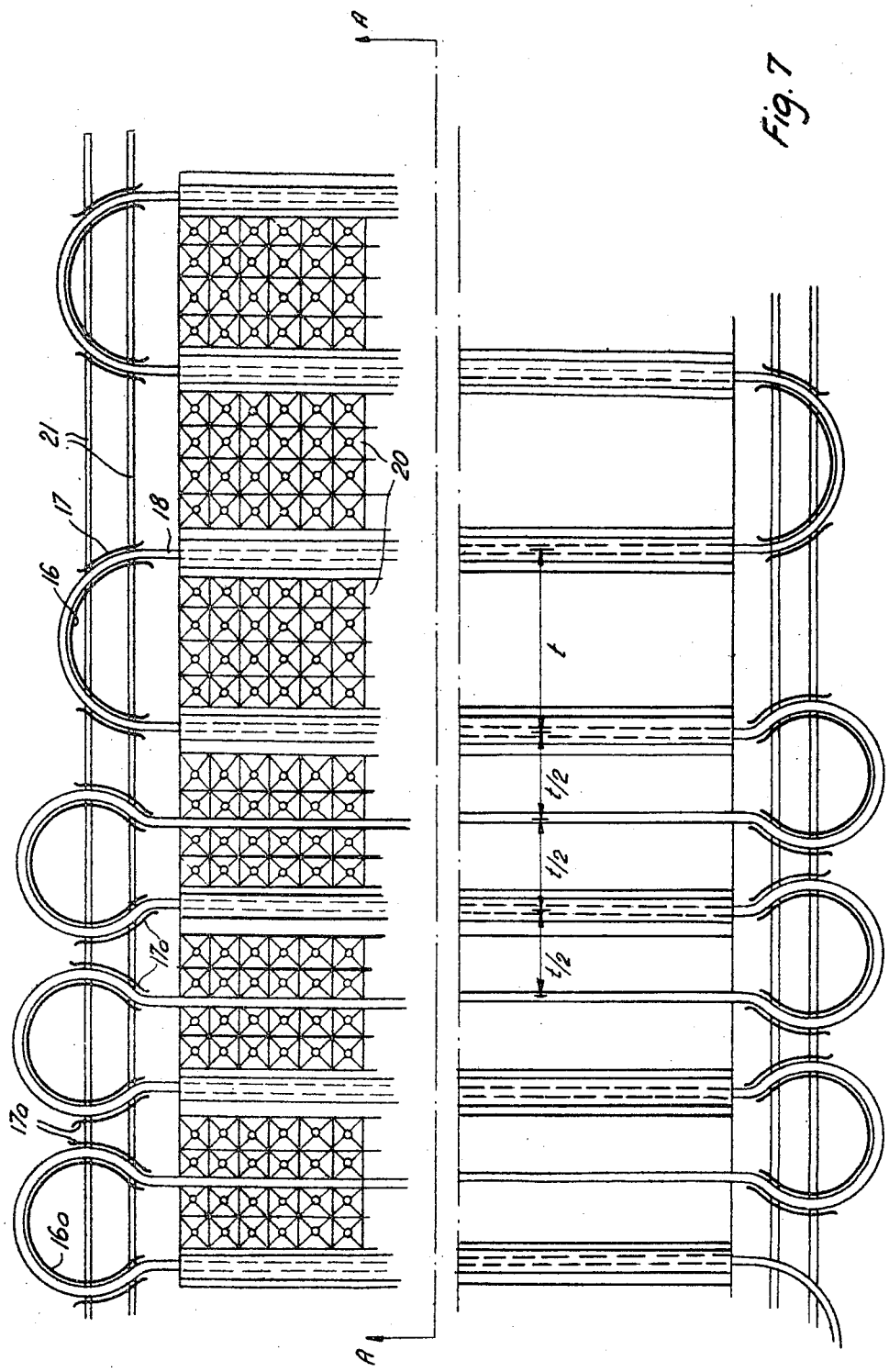

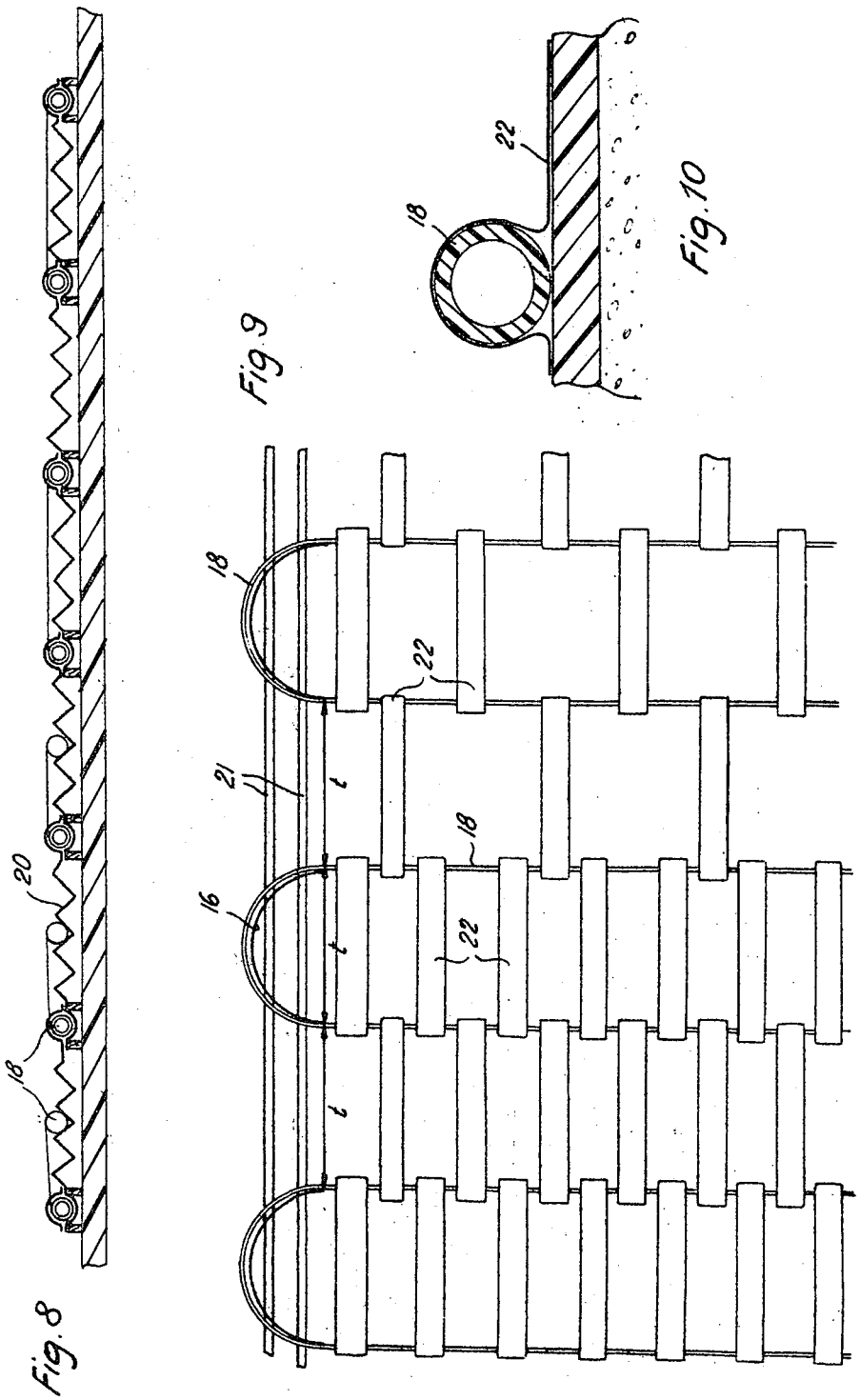

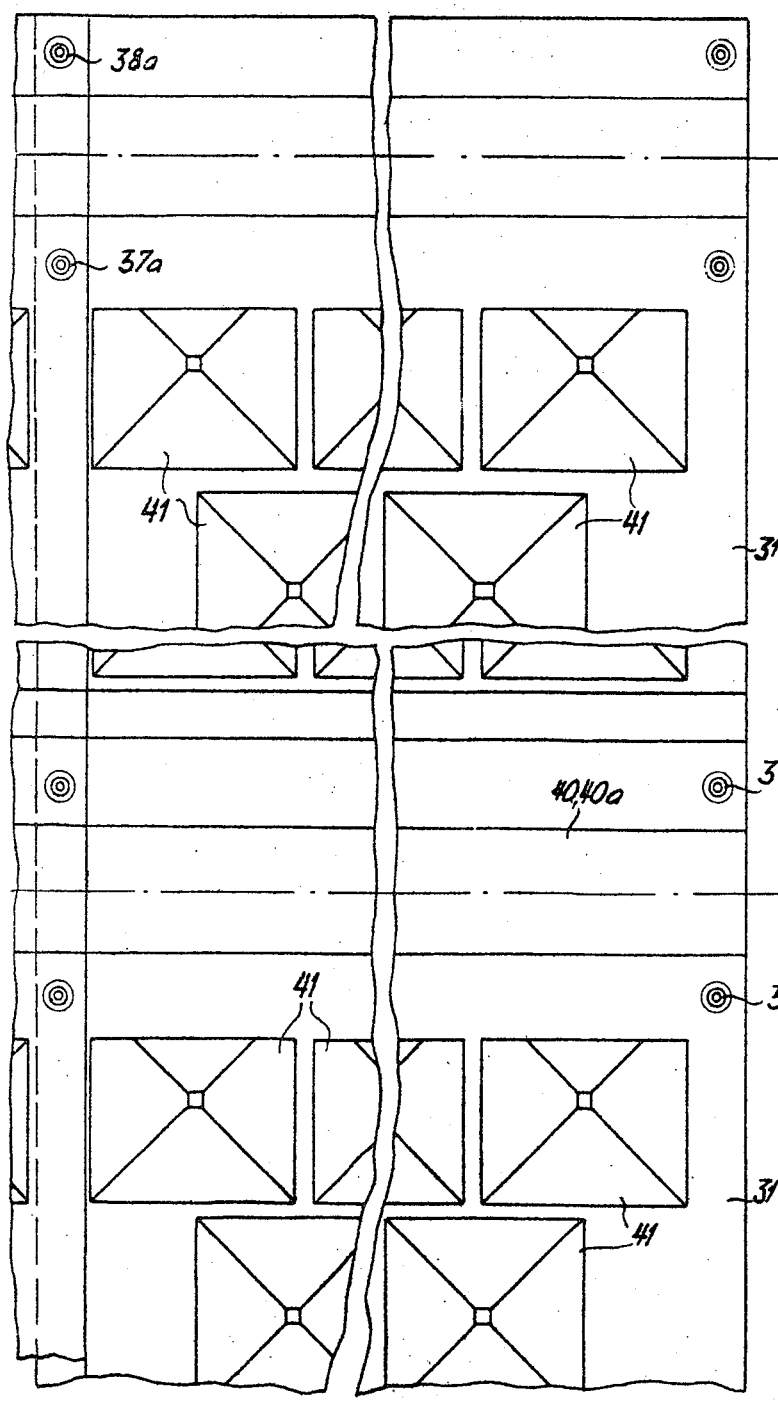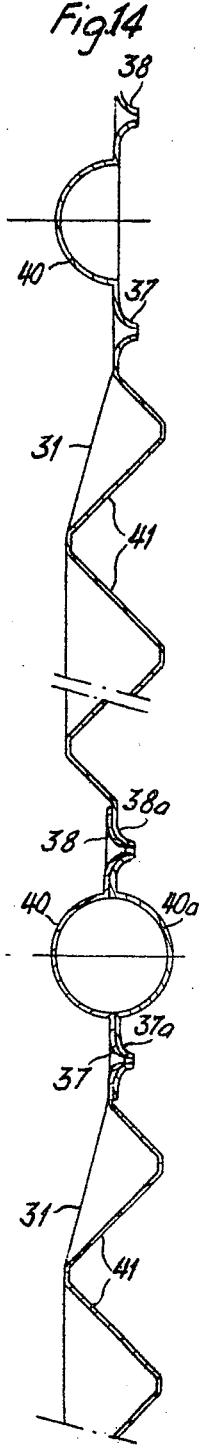

HOT WATER FLOOR HEATER

FIELD AND BACKGROUND OF THE INVENTION

In floor hot water heaters, it is presently customary to form the hot water carrying pipe coil of plastic. However, when forming the pipe coil of plastic, it has been found that not only is the heat transfer to the surrounding concrete and the uniform heat distribution to the entire floor surface relatively poor, but also satisfactory laying of the pipe coil presents difficulties. In known arrangements, the plastic pipe is formed into a pipe coil on the spot, by bending, and the pipe ducts and pipe bends are then secured, for example by means for clips or binding wire, on an insulating base or on a concrete lattice, forming a sub-floor, after which the concrete floor is poured. However, it is practically impossible to secure the parallel pipe ducts at exactly equal spacings from each other and with exactly the same connecting bends. The relatively rigid plastic pipes frequently used for this purpose also must be heated in order to enable them to be fixed in a somewhat correct position by means of the clips, which are laid according to a predetermined assembly plan.

Additionally, where parallel pipe ducts are interconnected by metal plates, acting in the manner of clips, to improve the heat transfer, an exactly parallel and constant spacing of the parallel ducts is particularly important.

SUMMARY OF THE INVENTION

The objective of the present invention is to provide a floor hot water heater of the mentioned type and which permits the deformation and fixing of the pipe coil in proper position without cumbersome assembly work. The floor hot water heater embodying the invention is characterized in that the connecting bends of the pipe coil are bent to extend around curved members serving as a laying gauge, these curved members being secured on laths fixed on the sub-floor and which laths extend preferably transverse to the parallel pipe ducts.

When a pipe coil embodying the invention is mounted, after the curved members have been secured on the laths, the pipe, consisting of plastic, for example, can be fixed with one end in the range of the first curved member on one side and can then be laid alternately, in meander form, around the corresponding curved members. The curved members, secured in position on the laths, may comprise upright flat bars projecting upwardly from the laths, and permit deformation of the pipe under stress, so that, after the pipe end has been fixed after bending around the last curved member, the pipe coil is fixed on the floor in correct position. That is, the pipe coil has exactly parallel pipe ducts extending at constant spacings from each other and connected with each other by identical connecting bends. It has also been found particularly advantageous to add metal powder to the plastic material of the pipe, in order to improve the heat transfer to the concrete, and to heat distribution plates, if the latter are provided.

Although the best solution consists in leaving the laying gauge provided by the curved members to be looped by the pipe bends, or forming insert troughs, in place, the curved members could be removed after the laid pipe coild has been fixed on the sub-floor. Since the heat transfer between the pipe and the concrete floor is relatively poor, the pipe must be operated with a high "lead" temperature which can attain a value of up to 65° C, and which manifests itself in a very unpleasant feeling on the floor due to colder spots and warmer spots. The distribution of the heat on the concrete becomes poorer with increasing heat, and the concrete must be produced with little cement so that it does not result in tension cracks and destruction of the concrete. The leaner the concrete, the poorer is the thermal conduction and the strength of the concrete. Due to the low heat conduction of the concrete, the heat transfer from the floor to the room to be heated is also poor, so that unsatisfactory compromises have to be made because of these mutual unfavorable influences. As a result, a floor heater can heat the room only insufficiently if the floor itself is not to be overheated.

These disadvantages are avoided by the present invention in that at least the parallel pipe ducts are embraced, at least partially, by clamp-like molded parts of a metal plate, and are maintained spaced from each other by the metal parts arranged between the clamp-like molded parts. The metal plates can extend over a part or over the entire length of the pipe ducts. In the latter case, they are preferably provided with deformations to increase the metal surface and which, together with the clamplike molded parts, serve not only to increase the heat transfer but also to stiffen and support the plates on the sub-concrete floor.

The metal structure can consist of a single plate, which fixes the entire pipe coil provided for the room to be heated, or it can consist of a plurality of plates each of which extends between two parallel pipe ducts. In the latter case, the metal plates can consist of several plate strips arranged in series along the pipe ducts. The deformations preferably are in the form of a plurality of conical, hemispherical, or pyramidshaped elevations connected with each other at their bases by narrow metal straps bearing on the sub-concrete floor. If the metal structure consists of the single part, a convex deformation in the form of a half shell, and into which the pipe cell is clamped or welded, for example, is sufficient for the insertion of the pipe coil. Such an arrangement is particularly suitable for prefabrication, where the metal structure, with the inserted pipe coil, can be brought to the construction site as a finished unit. If the sheet metal structure consists of several single plates, each plate can have, at one longitudinal edge, an upwardly curved half shell and, at the other longitudinal edge, a downwardly curved half shell, in such a way that, when the device is laid, the associated overlapping half shells of adjacent plates enclose a pipe duct completely.

In order to prevent the pipe ducts from being damaged at the points where they emerge from the clamplike sheet metal parts, the edges of the sheet metal parts can be conically widened.

If heated water is conveyed through the pipe coil, it heats the sheet metal structure and the latter heats the structural concrete. The main advantages are that the heat is distributed uniformly by the sheet metal structure from the pipe coil to the floor area, and is transferred effectively and rapidly by the deformations enlarging the surface engaged with the structural concrete, and that, thanks to the bearing of the structure on the floor with only relatively small strap parts, the heat transfer to the sub-concrete floor is minimal, so that it has an insulating effect.

However, it has been found, in some cases, that the heating power is still too low, despite these measures, unless the floor is overheated, which has an unpleasant effect. There are zones on the floor, primarily adjacent windows and outer walls, where a temperature increase, with respect to the total area, is not only tolerable but is even desirable. To this end, in accordance with the invention, at least one zone of the pipe coil, bounded by two parallel pipe ducts, has more heat transferring elements than an adjacent zone. Thus, for example, two parallel adjacent pipe ducts can be thermally connected with each other in all zones by a plurality of metallic or metal-containing connecting strips, where the number of connecting strips in one or several marginal zones is greater than in the other zones. Another expedient possibility consists in reducing the division of the parallel pipe ducts, that is, the mutual spacing, closer to the edges of the floor. A particularly advantageous solution consists in halving the division or pitch of the parallel pipe ducts in the vicinity of the edges of the floor, as compared to the other zone, connecting two of the ducts of all zones arranged according to the pipe duct division or pitch of the other zones with each other in clamp-fashion by metallic or metal-containing strips, while the pipe duct of a half division not so connected and which is connected by a connecting bend looping a correspondingly more sharply curved curved member with a lamellae-connected pipe duct, rests unconnected on the strips. In both cases, the heat transfer elements are increased in the respective marginal zones, as compared to the remaining zones.

An object of the invention is to provide an improved floor hot water heater.

Another object of the invention is to provide such an improved floor hot water heater which permits deformation and fixing of the pipe coil in proper position without cumbersome assembly work.

A further object of the invention is to provide such an improved floor hot water heater which avoids the disadvantages of known floor hot water heaters of the type having spaced parallel pipe ducts interconnected by pipe bends.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a partial top plan view of one embodiment of a floor hot water heater in accordance with the invention;

FIG. 2 is a cross-sectional view taken along the line II—II of FIG. 1;

FIG. 3 is a front elevation view, on an enlarged scale, illustrating a detail of FIG. 1 and taken in the direction of the arrow a;

FIG. 4 is a cross-sectional view, to an enlarged scale, taken along the line IV—IV of FIG. 1;

FIG. 5 is a sectional view illustrating, to an enlarged scale, a part of the device of the invention during assembly;

FIG. 6 is a cross-sectional view, to an enlarged scale, taken along the line VI—VI of FIG. 1;

FIG. 7 is a partial top plan view illustrating another embodiment of the invention;

FIG. 8 is a cross-sectional view taken along the line A—A of FIG. 7;

FIG. 9 is a partial top plan view illustrating another embodiment of the invention;

FIG. 10 is a cross-sectional view, to an enlarged scale, of a detail of FIG. 9;

FIG. 13 is a partial top plan view, to an enlarged scale, corresponding to FIG. 11; and FIG. 14 is a cross-sectional view of FIG. 13.

DESCRIPTION OF THE PREFERRED EMBODIMENTS

Figure 12:
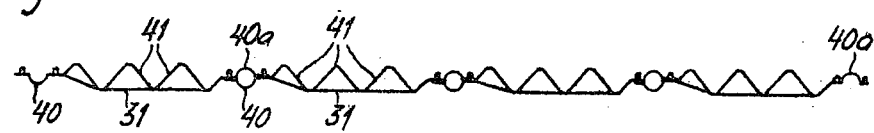
FIG. 12 is a cross-sectional view taken along the line a-b of FIG. 11.

Referring first to the embodiment of the invention shown in FIGS. 1-6 of the drawing, two parallel supporting laths 1, preferably formed by flat bars, are fixed on the subfloor at some distance from opposite side walls of the room to be heated. Such a fixing can be effected, as seen for example from FIGS. 4 and 6, by means of bolts 4 driven through the insulation 2 into the concrete 3, bolts 4 being insulated, in the range of the laths 1, by insulating plugs 5, for example rubber plugs, inserted into the laths 1 to avoid cold bridges.

Supporting laths 1 have secured thereto curved members 6 formed of circularly curved flat bars placed on edge and arranged on the laths 1 so that the free ends project slightly inwardly of laths 1. At both sides of curved members 6, adjacent their ends, the laths 1 are provided with edge supported flat iron members 7 with each pair of members 7 spaced apart a distance substantially equal to the external diameter of the bends of the heating pipe coil, the members 7 extending transversely of the laths 1 and being secured thereto. The curved member 6 with their associated flat iron members 7 on the two laths 1 are so staggered, longitudinally of the laths, that the "exit" end of a trough on one lath is exactly aligned with the "entrance" of a corresponding trough on one other lath. Thus, and as can be seen from FIG. 1, each trough, formed by a curved member 6 and two flat bar members 7, on one lath opens toward a space between two adjacent troughs, each formed by a curved member 6 and a pair of flat bar members 7, on the other lath.

The hot water-carrying heating coil pipe 8 is laid, in meander form, through these troughs above the laths 1, with the connecting bends of the pipe coil tightly looping the respective curved members 6, thus providing exactly parallel substantially rectilinear pipe ducts extending between the two supporting laths 1 in the above-described arrangement. The laying of pipe 8 is, in this case, particularly simple, since the curved members 6 form, with their troughs, a laying gauge, by which a plastic pipe, for example, can be laid under stress. The arrangement not only assures parallelism of the pipe coil rectilinear ducts interconnecting the pipe coil bends, but also a constant spacing of the pipe ducts connected by completely identical bends. The pipe coil thus laid is secured, over the entire range of the troughs, against falling out or displacement, for example by clamps 9, as shown in FIG. 3.

While it has been assumed that the curved members 6 and the flat bar members 7 are fixed permanently on the laths 1, these members can also be arranged disengageably on the laths 1, however, and be replaced by members of a different size with a different stagger so that, after the laths have been installed, the pipe duct spacing best suitable for the respective case can be selected on the spot.

In principle, the heating coil pipe 8 could consist of metal, but the laying of a plastic pipe is simpler, due to its greater flexibility. However, plastic pipes have the disadvantage that they are poor heat conductors. For this reason, it has been found particularly advantageous to add, to the plastic used to form the pipe 8, a metal powder, such as powdered aluminum or powdered copper. By this expedient, the thermal conductivity of the pipe can be considerably increased without substantially reducing its flexibility.

A further improvement of the heat transfer, and a particularly uniform heat distribution over the entire floor area, is attained by metal lamellae 10, formed, for example, of copper or aluminum, and which are thermally connected with the parallel ducts of the pipe coil, by bridging the interval between adjacent pipe ducts. The mounting of these lamellae 10 is particularly simple due to the constant spacing between the parallel pipe ducts of the pipe coil. Between the two supporting laths 1, there can be provided lamellae which consist of one piece, or lamellae which are divided into several sections, as shown in FIG. 1, depending on the distance between the laths.

In the embodiment illustrated in FIGS. 1 through 6, the lamellae 10 have a center panel of pyramid-shaped depressions 11 arranged in rows. Depressions 11, which can naturally also have any form, such as conical or hemispherical, effect not only a considerable stiffening of the lamellae but also a considerable increase of the heat transfer or heat distribution surface. The lamellae edge zones, extending parallel to the parallel pioe ducts, are provided, inwardly of the free edges thereof, with upwardly or downwardly curved throughs 12 having a diameter corresponding to the diameter of the pipe 8. The trough 12 of one lamellae 10 embracing the lower half of a pipe duct is closed by the trough 12 of the adjacent lamellae 10 embracing the other half of the pipe duct to form a tubular shell surrounding the pipe duct. The edge zones of the lamellae 10 embracing a pipe duct and overlapping each other are rigidly connected with each other at both sides of the pipe 8, so that a satisfactory, thermally conductive contact is attained between the pipe 8 and the lamellae.

In order to facilitate the interconnection of the lamellae 10 and to assure, at the same time, their bearing on the insulation, wood strips 13 are arranged at both sides of the pipe ducts under the plane sheet metal strips at each side of the troughs 12. The interconnection of the lamellae 10 can be effected by means of clamps, clasps, etc., enclosed or embedded in the wood strips 13. As can be seen from FIG. 5, the wood strips 5 preferably are secured to the sub-floor or insulating base 2 before being secured to the undersurfaces of the edge zones of the lamellae 10 provided with the bottom trough 12. This assures a rapid and secure assembly of the lamellae 10.

The above-described floor hot water heater not only can be mounted simply and accurately but also results in the satisfactory heat transfer, uniformly distributed over the covered floor area.

In the embodiment of the floor hot water heater shown in FIGS. 7 and 8, the hot water carrying pipe coil 18 comprises a pipe consisting, for example, of plastic. The division or pitch in the main zones, which is the distance between adjacent parallel pipe ducts in these zones, is indicated, in FIG. 7, at $t$. These principal pipe ducts are connected with each other by semi-circular connecting bends which are looped around corresponding curved members 16 secured on laths 21 extending transversely to the pipe ducts and secured on the sub-floor or insulating base. Correspondingly curved guide members 17, also secured on laths 21, cooperate with curved members 16 to form inserting troughs for the pipe connecting bends. The three zones on the left in FIG. 7 have, between two adjacent parallel pipe ducts, half the spacing or pitch ($t/2$) of the principal pipe ducts at the right half of FIG. 7. For this purpose, correspondingly curved members 16a are secured on the laths 10 and have associated therewith corresponding guide members 17a forming, with the members 16a, troughs. Since, in pratice, the pitch or spacing $t$ is relatively small, amounting at most to about 28cm, and, on the other hand, the permissible bending angle of plastic plates cannot be too small, the curved member 16a, whose radius is somewhat greater than half the radius of the curved member 16, extend through an angle of more than 180°, thus to arrive at a half pitch $t/2$ of the related pipe ducts.

The pipe ducts arranged at a spacing or pitch $t$ from each other can be seen clearly in FIG. 8. These pipe ducts are connected to each other by lamellae 20 formed with a plurality of elevations and depressions which embrace the pipe ducts like clamps. This means that only one of the pipe ducts connected by a connecting band and which has zones with the pitch $t/2$ is connected by these lamellae 20 with another pipe duct, while the other of the two pipe ducts bears on these lamellae 20. It is thus possible to increase the heat transfer in any desired zones, particularly those extending along the walls having windows or along outer walls.

In the embodiment of the floor hot water heater shown in FIGS. 9 and 10, in which the curved members 16 and laths 21 correspond to the embodiment shown in FIGS. 7 and 8, the pipe coil has, in all zones, the same division or pitch $t$. However, in the embodiment of FIGS. 9 and 10, adjacent pipe ducts of the two edge zones on the left are connected with each other thermally by a larger number of connecting strips 22 consisting of metal or metal powder-containing plastic than are the pipe ducts of the other zones to the rightin FIG. 9. The strips 22 clamped on the pipe ducts, as shown in FIG. 10, assure, with a greater number, an increased heat transfer as compared to zones having fewer connecting strips 22. In each case, however, the gauge forming curved members 16 and laths 21, provided for laying and anchoring the pipe coil, permit arranging the pipe ducts at the proper spacing so that subsequent attachment of the connecting lamellae can be effected without any fitting difficulties.

Figure 11:
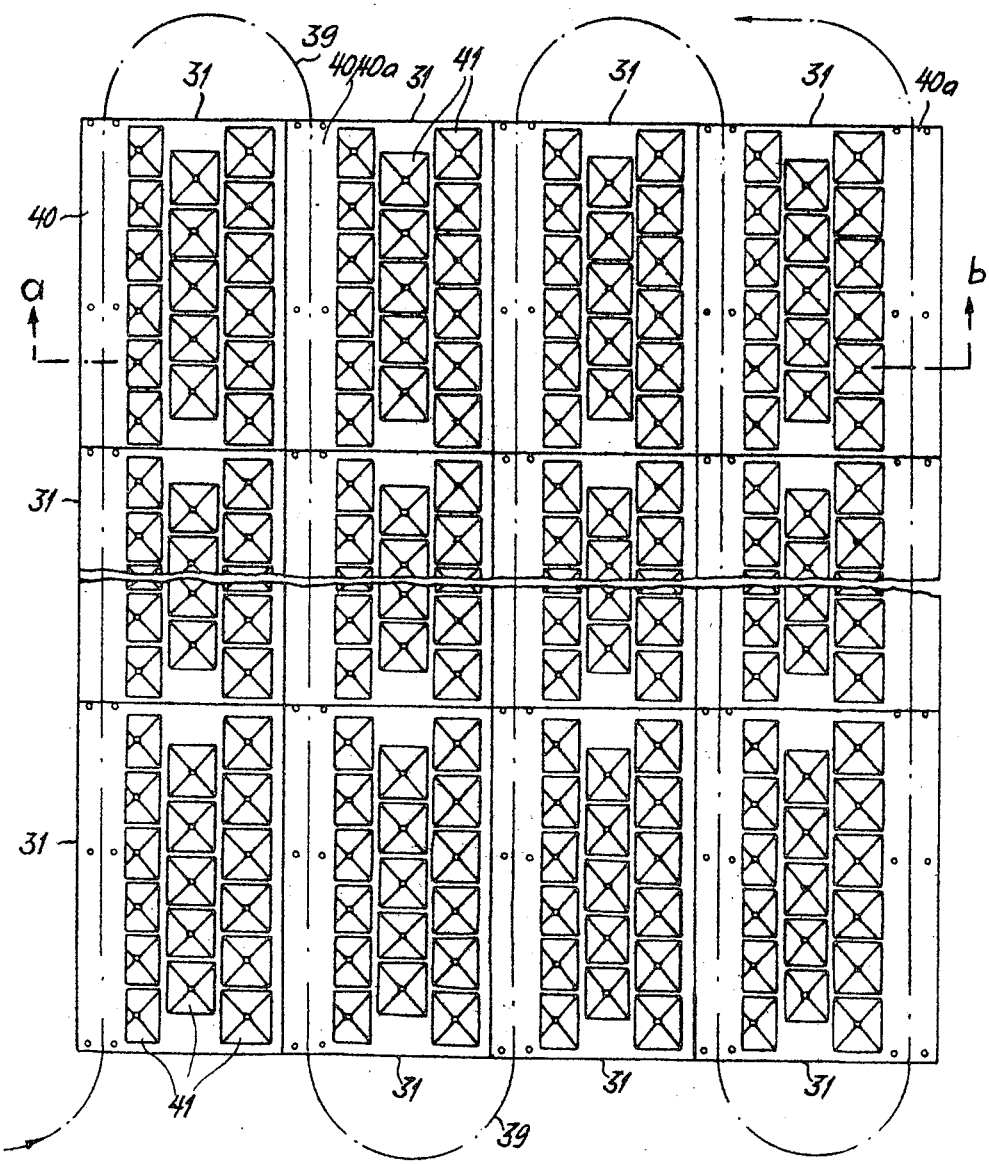
FIG. 11 is a top plan view of an installed floor hot water heater embodying the invention.

FIGS. 11 through 14 illustrate a sheet metal structure composed of heating plates in association with a hot water carrying pipe coil. Conical hollow rivets 37, 38, at one end of each lamellae, and 37a, 38a, at the opposite end thereof, deformed integrally out of the sheet metal, hold the individual plates together immovably. The hot water carrying pipe 39 is clamped between overlapping half shells 40 and 40a provided on the opposite longitudinal edges of the plates, the hollow rivets 37, 38 and 37a, 38a preferably being upset after the pipe 39 has been inserted between the two superposed sheet metal plates. Between the holding portions 40 and 40a for the pipe 39, the plates 31 are formed with pyramid-shaped elevations 41, which are arranged in rows and staggered relatively to each other in adjacent rows.

During the laying of the pipe, the hot watercarrying pipe 39 is inserted into the lower and upwardly opening half shells 40, after it has been looped about curved members secured on the cross rails or laths and clamped in the correct position, that is, to provide parallel pipe ducts arranged at constant spacings from each other, after which the upper downwardly opening half shells 40a of the upper plate enclose the water-carrying pipe 39 which is then clamped between the half shells 40 and 40a responsive to upsetting of the hollow rivets 37, 38 and 37a, 38a. The pipe coil is connected to water feed and discharge pipes.

The clamp-type half shells, the hollow rivets, and the elevations 41, are preferably pressed in a single operation. It is essential that the sheet metal straps interconnecting the bases of the elevations 41, and which serve as a support, extend coplanar with the underside of the lower half shells 40, so that the sheet metal structure, with the pipe coil 39, bears properly on a plane surface of the sub-concrete floor. On the other hand, the apices of the elevations 41 preferably extend to a plane which is common with the top surfaces of the upper half shells 40a. It will be readily understood that the usual overall height of the structural concrete, which is generally about 5cm, is maintained, but that, due to the elevations 41, not only do considerable parts of the sheet metal structure extend very close to the top side of the structural concrete but also the mass of the required, and thus to be heated, structural concrete is considerably reduced as compared to a conventional floor heating system. In addition, the cavities under the elevations 41 have an insulating effect.

For the sake of completeness, it should be mentioned that it is not only when the entire device is prefabricated into an integral or integrated sheet metal structure, that is when the pipe coil is not initially clamped on the spot about curved members secured on the laths, the connecting bends of the pipe coil can be inserted into clamp-type arcuate shells of edge zones of the sheet metal structure and serving as a pipe coil laying gauge.

In the embodiment of the invention illustrated in FIGS. 11 through 14, the heating plates 31 are bent up into the central or mid plane at one edge zone, illustrated in the drawing as the right edge zone, directly after the last row of elevations 41, while the heating plates 31 are bent up, in the other edge zone or the left edge zone as shown in the drawing, immediately after the second last row of elevations 41 into this plane, the last row of elevations 41 being only partly formed. This unsymmetrical design of the edge zones of the plates is due to the relatively small width of the plates, as compared to the size of the elevations. Naturally, the elevations in all the rows can be completely formed and the plates can be bent up symmetrically into the center plane at both edge zones thereof.

The embodiment of the invention shown in FIGS. 11 through 14 is particularly suitable for a low-temperature flow heating system, where the entire structural concrete or floor is uniformly heated. With the described design, the heat transfer to the room is assured, even at low temperatures, and secondary effects in the concrete in the floor, such as cracks and the like, are avoided. Another advantage is that the concrete can be anchored between the elevations so that its strength is increased. Still a further advantage is that the heater bears with only a small area, about 30% of its entire area, on the underlying insulation, and the cavities of the elevations act as an insulation for heat and sound absorption toward the concrete cover.

While specific embodiments of the invention have been shown and described in detail to illustrate the application of the principles of the invention, it will be understood that may be embodied otherwise without departing from such principles.

The embodiments of the invention in which an exclusive property or privilege is claimed are defined as follows:

1. In floor hot water heater in the form of a hot water-carrying pipe coil for support on a base and having spaced substantially rectilinear parallel pipe ducts interconnected by pipe bends, the improvement comprising, in combination, a plurality of horizontally curved members spaced longitudinally in two rows at fixed distances from each other substantially equal to the distance between two adjacent pipe ducts, with the rows being spaced laterally by a distance of the order of the length of said pipe ducts and the curved members of each row facing those in the other row and staggered relative to the curved members in such other row; and a pair of relatively elongated laths extending transversely of said pipe ducts and secured on the support base; said horizontally curved members being fixedly secured on the upper surfaces of said laths to extend upwardly therefrom; the pipe forming said pipe coil being bent around said horizontally curved members, and said horizontally curved members serving as gauges for the bending of the pipe to form the coil and for accurate parallel spacing of said pipe ducts.

2. In a floor hot water heater, the improvement claimed in claim 1, in which said pipe coil consists of metal powder-containing plastic.

3. In a floor hot water heater, the improvement claimed in claim 1, including heat transmitting metal lamellae secured to said parallel pipe ducts and interconnecting adjacent parallel pipe ducts.

4. In a floor hot water heater, the improvement claimed in claim 3, in which each metal lamellae interconnects two adjacent pipe ducts; each metal lamellae having adjacent one edge thereof a half shell formation for embracing one pipe duct from underneath and, adjacent the other edge zone thereof, a half shell formation for embracing the otherpipe duct from above; whereby two adjacent and overlapped lamellae form a shell completely embracing each pipe duct.

5. In a floor hot water heater in the form of a hot water-carrying pipe coil for support on a base and having spaced substantially rectilinear parallel pipe ducts interconnected by pipe bends, the improvement comprising, in combination, means forming two rows of curved members spaced longitudinally at fixed distances from each other, with the rows being spaced laterally by a distance of the order of the length of said pipe ducts and the curved members of each row facing those in the other row and staggered relative to the curved members in such other row; said pipe bends extending around said curved members; a pair of relatively elongated laths extending transversely of said pipe ducts and secured on the support base; said curved members being fixedly secured on said laths; and respective stop members secured to said laths adjacent each end of a curved member and spaced from such end by a distance substantially equal to the diameter of said pipe coil, said curved members and said stop members conjointly forming troughs for insertion of said pipe bends thereinto.

6. In a floor hot water heater, the improvement claimed in claim 5, in which at least one zone of the pipe coil, extending through at least two parallel pipe ducts, includes a larger number of heat-transmitting elements than the number thereof in an adjacent zone of the pipe coil.

7. In a floor hot water heater, the improvement claimed in claim 6, in which the spacing between the parallel pipe ducts in said at least one zone is less than the spacing between said parallel pipe ducts in the adjacent zone, with said parallel pipe ducts constituting said heat-transmitting elements.

8. In a floor hot water heater, the improvement claimed in claim 7, in which the spacing between said parallel pipe ducts in said at least one zone is substantially one half the spacing of the parallel pipe ducts in the adjacent zone.

9. In a floor hot water heater, the improvement claimed in claim 8, in which said curved members in said adjacent zone in which the parallel pipe ducts have a full spacing from each other have a semi-circular form; the curved members in said at least one zone in which said parallel pipe ducts have a half spacing from each other, extending through more than 180° and having a radius which is larger than half the radius of the semi-circular curved members.

10. In a floor hot water heater, the improvement claimed in claim 9, including lamellae interconnecting the parallel pipe ducts in all zones in which the parallel pipe ducts have a full spacing from each other, said last mentioned lamellae being formed with elevations and depressions; the parallel pipe ducts in those zones in which the parallel pipe ducts have a half spacing being free of connection by said last-mentioned lamellae and resting thereon.

11. In a floor hot water heater, the improvement claimed in claim 10, in which said last-mentioned lamellae are metal lamellae.

12. In a floor hot water heater, the improvement claimed in claim 10, in which said last-mentioned lamellae consists of metal powder-containing plastic.

13. In a floor hot water heater, the improvement claimed in claim 6, including connecting strips of metal interconnecting the parallel pipe ducts in all zones in which the parallel pipe ducts have a full spacing from each other; the number of connecting strips in at least one zone being larger than the number in the other zones.

14. In a floor hot water heater, the improvement claimed in claim 6, including connecting strips of metal powder-containing plastic interconnecting the parallel pipe ducts in all zones in which the parallel pipe ducts have a full spacing from each other; the number of connecting strips in at least one zone being larger than the number in the other zones.

15. In a floor hot water heater, the improvement claimed in claim 6, including connecting strips comprising metal interconnecting the parallel pipe ducts in all zones in which the parallel pipe ducts have a full spacing from each other; the number of strips in at least one zone being greater than the number of strips in the other zones; said strips clasping said parallel pipe ducts.

16. In a floor hot water heater, the improvement claimed in claim 5, including clamps securing said pipe bends in said insertion troughs.

17. In a floor hot water heater, the improvement claimed in claim 5, including insulating bushings extending through said laths; and bolts extending through said insulating bushings for securing said laths to the support base free of cold bridges.

18. In floor hot water heater in the form of a hot-water carrying pipe coil for support on a base and having spaced substantially rectilinear parallel pipe ducts interconnected by pipe bends, the improvement comprising, in combination, means forming two rows of curved members spaced longitudinally at fixed distances from each other, with the rows being spaced laterally by a distance of the order of the length of said pipe ducts and the curved members of each row facing those in the other row and staggered relative to the curved members in such other row; said pipe bends extending around said curved members; heat transmitting metal lamellae secured to said parallel pipe ducts and interconnecting adjacent parallel pipe ducts; each metal lamellae interconnecting two adjacent pipe ducts; each metal lamellae having adjacent one edge thereof a half shell formation for embracing one pipe duct from underneath and, adjacent the other edge zone thereof, a half shell formation for embracing the other pipe duct from above; whereby two adjacent and overlapped lamalleae form a shell completely embracing each pipe duct; wooden strips supporting edge zones of adjacent overlapping metal lamellae embracing a pipe duct on opposite sides of the pipe duct; and means rigidly connecting said edge zones with said wooden strips.

19. In a floor hot water heater, the improvement claimed in claim 18, in which said metal lamellae are formed with a plurality of depressions and elevations arranged, respectively, in alternating rows.

20. In a floor hot water heating, the improvement claimed in claim 19, in which said elevations are pyramid-shaped and are arranged in staggered rows extending longitudinally of said pipe ducts.

21. In a floor hot water heater, the improvement claimed in claim 20, in which the apices of said pyramid-shaped elevations terminate in a plane which is coplanar with the upper surfaces of the upwardly curved half shells, and the bases of said pyramid-shaped elevations are coplanar with the undersurface of the downwardly curved half shells.

22. In a floor hot water heater, the improvement claimed in claim 18, in which said half shells are slightly increased in width at their open ends.

23. In a floor hot water heater, the improvement claimed in claim 18, in which said curved members comprise clamp-type arcuate shells in the edge zones of a sheet metal structure constituting said heat-transmitting metal lamellae connecting said parallel pipe ducts.

* * * * *